United States Patent
Di Giusto et al.

(10) Patent No.: US 8,038,215 B2
(45) Date of Patent: Oct. 18, 2011

(54) ERGONOMIC SUPPORT DEVICE FOR THE BODY OF THE OCCUPANT, FOR CHAIRS OR SEATS, PARTICULARLY FOR MOTOR-VEHICLE SEATS

(75) Inventors: Nevio Di Giusto, Orbassano (IT);
Gianfranco Innocenti, Orbassano (IT);
Tommaso Luchetti, Orbassano (IT);
Salvatore Demontis, Orbassano (IT)

(73) Assignee: C.R.F. Società Consortile per Azioni, Orbassano (Torino) (IT)

(*) Notice: Subject to any disclaimer, the term of this patent is extended or adjusted under 35 U.S.C. 154(b) by 276 days.

(21) Appl. No.: 12/432,244

(22) Filed: Apr. 29, 2009

(65) Prior Publication Data
US 2010/0033002 A1    Feb. 11, 2010

(30) Foreign Application Priority Data

Aug. 7, 2008   (EP) .................................. 08425550

(51) Int. Cl.
*A47C 7/46* (2006.01)
*A47C 3/00* (2006.01)
(52) U.S. Cl. .................................. 297/284.1; 297/284.4
(58) Field of Classification Search .............. 297/284.1, 297/284.4, 284.2
See application file for complete search history.

(56) References Cited

U.S. PATENT DOCUMENTS

| | | | | |
|---|---|---|---|---|
| 4,858,992 A | * | 8/1989 | LaSota | 297/284.2 |
| 5,058,952 A | * | 10/1991 | LaSota | 297/284.2 |
| 7,309,104 B2 | * | 12/2007 | Browne et al. | 297/284.1 |
| 7,905,547 B2 | * | 3/2011 | Lawall et al. | 297/284.4 |
| 2007/0246285 A1 | | 10/2007 | Browne et al. | |

FOREIGN PATENT DOCUMENTS

WO    WO 2006/096430    9/2006

OTHER PUBLICATIONS

Communication under Rule 71(3), issued on Mar. 18, 2010 in connection with EP Application No. 08425550.4, corresponding to the above-referenced application.
European Search Report for EP 08425550.4 dated Dec. 18, 2008.

* cited by examiner

*Primary Examiner* — Anthony D Barfield
(74) *Attorney, Agent, or Firm* — Nixon & Vanderhye P.C.

(57) ABSTRACT

A chair or a seat, in particular a seat for motor vehicles, includes an ergonomic device for supporting the body of the occupant, comprising a supporting panel having supporting laths, set at a distance from one another, which can be arched towards the body of the occupant, each independently of the others, by a respective actuator, which includes an actuator element constituted by a shape-memory material, which undergoes a reduction in length following upon heating above a predetermined transition temperature, higher than ambient temperature. Associated to the panel are electrical-supply means for supply of the shape-memory actuators and electronic control means for activating the laths independently and/or in succession according to any predetermined logic, in particular according to successive waves of activation, for example from above downwards, or from below upwards, or alternately from above and from below, so as to obtain a massaging effect.

11 Claims, 5 Drawing Sheets

ERGONOMIC SUPPORT DEVICE FOR THE BODY OF THE OCCUPANT, FOR CHAIRS OR SEATS, PARTICULARLY FOR MOTOR-VEHICLE SEATS

This application claims priority to European Patent Application No. 08425550.4 filed Aug. 7, 2008, the entire contents of which is hereby incorporated by reference.

The present invention relates to an ergonomic device for supporting the body of the occupant, for chairs or seats, in particular for seats of motor vehicles and, even more in particular, for backrests of seats for motor vehicles.

The object of the present invention is to provide a device of this sort that will guarantee a correct posture of the occupant of the chair or seat, providing maximum comfort of the user and, in the particular case of application to a seat for motor vehicles, likewise reducing fatigue of the body, and in particular of the back, of the user also in the event of long journeys.

A further object of the invention lies in the fact of providing a device that, albeit achieving all the purposes referred to above, presents a structure that is relatively simple and inexpensive to produce.

With a view to achieving the above purposes, the subject of the invention is a device having the characteristics specified in the annexed claim 1.

Thanks to said characteristics, the device according to the invention enables, on the one hand, maximum ergonomics of posture and maximum comfort of the user. As already mentioned, the device according to the invention is of general application to any type of chair or seat, but is designed in particular to be applied to seats of motor vehicles. Also in this case, the device of the invention is of general application, since it can be applied both to the backrest and to the cushion of the seat. However, the preferred embodiment presented herein is designed, in particular, for the backrest of seats of motor vehicles. As has been said, it affords the advantage, on the one hand, of reducing substantially the risk of fatigue even in the case of long journeys and, on the other hand, of presenting at the same time a structure that is relatively simple and inexpensive to produce.

Shape-memory metal alloys have been developed and used for some time in a wide range of applications. The present applicant is holder of various patents regarding the application of shape-memory actuators to the control of members or components of motor vehicles, for example for the release of locks of doors of motor vehicles, or for the control of the oscillation of deflecting walls within air-conditioning systems of motor vehicles or for a wide range of other applications. See in this connection, for example, the documents Nos. EP-A-1 013 503, EP-A-1 164 287, EP-A-1 195 276, EP-A-1 245 762, EP-A-1 247 992, EP-A-1 241 351, EP-A-1 399 793, EP-A-1 443 227, EP-A-1 611 4305, EP-A-1 479 921, EP-A-1 516 773, EP-A-1 493 641, EP-A-1 521 035, EP-A-1 541 542, EP-A-1 602 864 EP-A-1 580 512, EP-A-1 598 568, EP-A-1 593 844, EP-A-1 677 014, EP-A-1 726 483, EP-A-1 726 763, EP-A-1 726 467, EP-A-1-1767 804, EP-A-1 832 453. In the case of some of the aforesaid preceding proposals, there has already been considered the application of shape-memory actuator means of the type described above for the control of mobile parts in a seat for motor vehicles (see, for example, EP-A-1 516 773). There has moreover already been proposed in the art (see, for example, US 2007\0246285 A1) provision of a seat for motor vehicles that uses in general active material for modifying the configuration of a surface of the seat.

The invention provides a new solution, which is simple and effective, to the problem of ensuring an optimal support for the body of the occupant of a chair or seat, enabling at the same time exploitation of additional functionalities, as will emerge from what follows.

BRIEF DESCRIPTION OF THE DRAWINGS

The present invention will now be described with reference to the annexed drawings, which are provided purely by way of non-limiting example and in which.

DETAILED DESCRIPTION OF THE INVENTION

Figure 1:
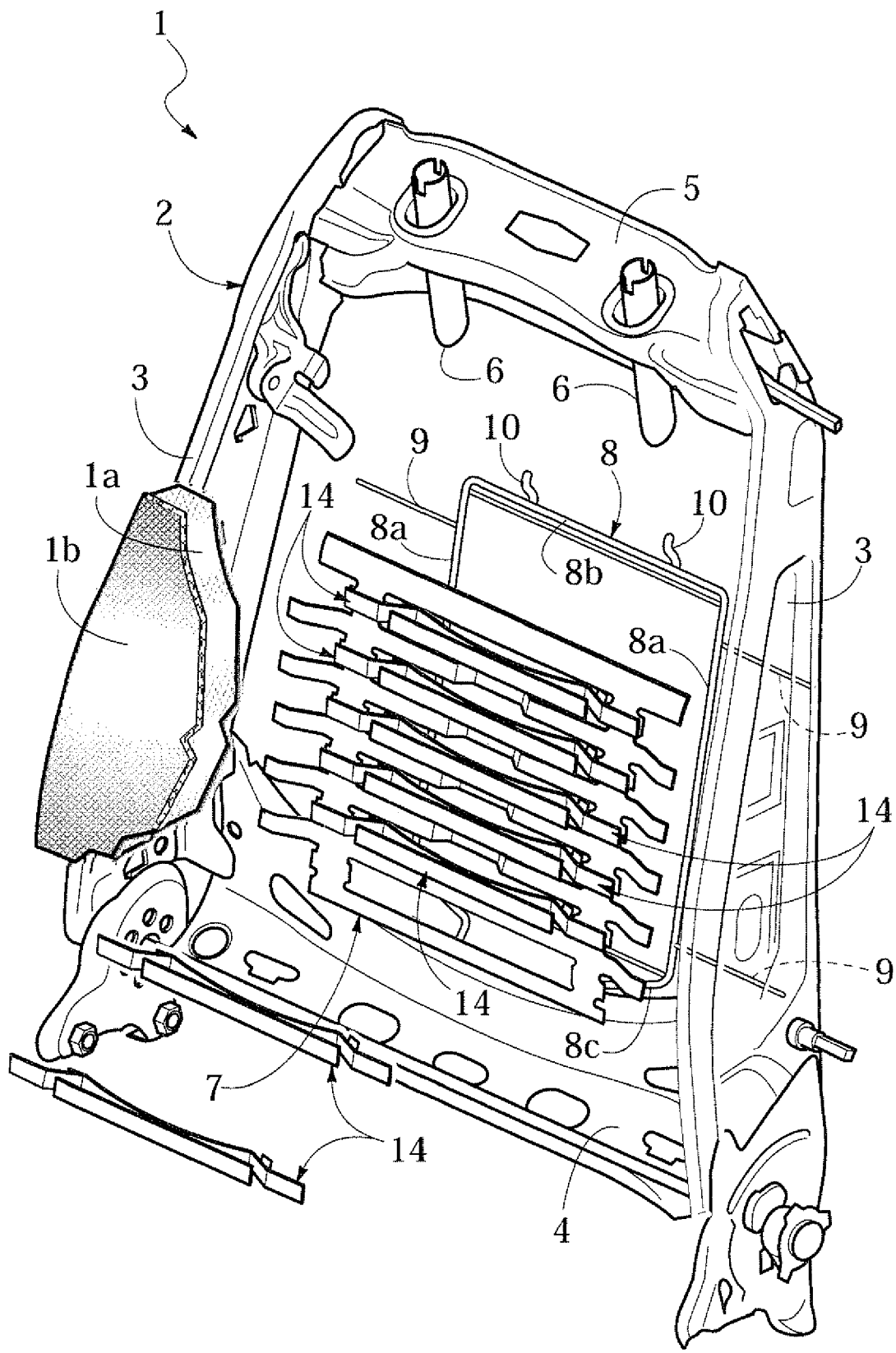
FIG. 1 illustrates a perspective view of the frame of the backrest of a seat to which the device according to the present invention is applied.

With reference to the drawings, number 1 designates as a whole the backrest of a seat for motor vehicles, in which the padding 1a of the backrest, with the corresponding coating fabric 1b, is illustrated only partially, in order to render the internal structure of the backrest clearly visible. Said structure comprises a frame 2, for example made of sheet metal, comprising two side uprights 3 joined by a bottom cross member 4 and by a top cross member 5. The top cross member 5 is provided with tubular elements 6 designed to receive and guide the supporting rods of a headrest (not illustrated). The reference number 7 designates as a whole a lumbar supporting panel that is connected to an auxiliary supporting frame 8 anchored, or connected in any way, to the frame 2 of the backrest.

Figure 2:
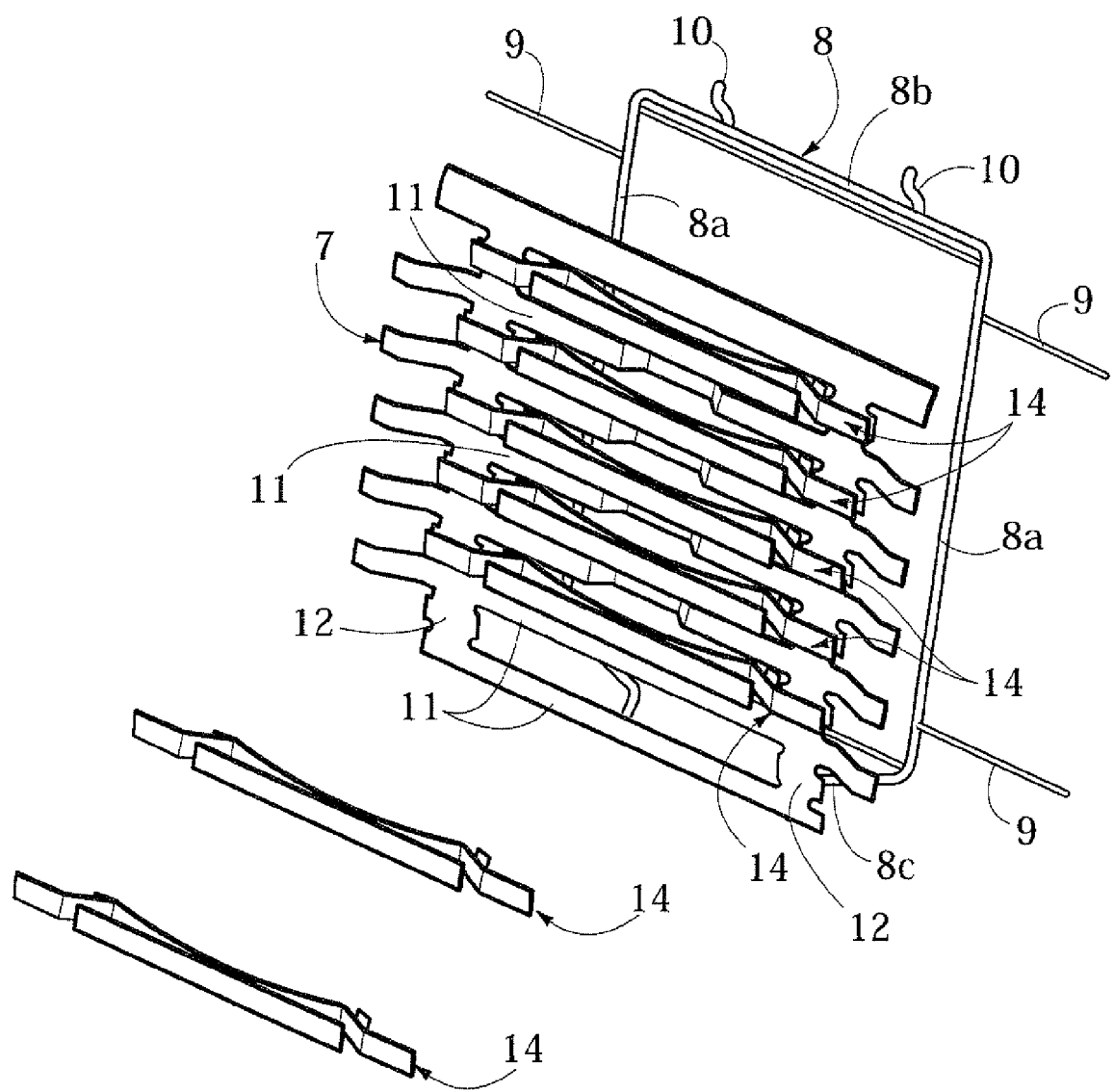
FIG. 2 illustrates a detail of FIG. 1 at an enlarged scale.
Figure 3:
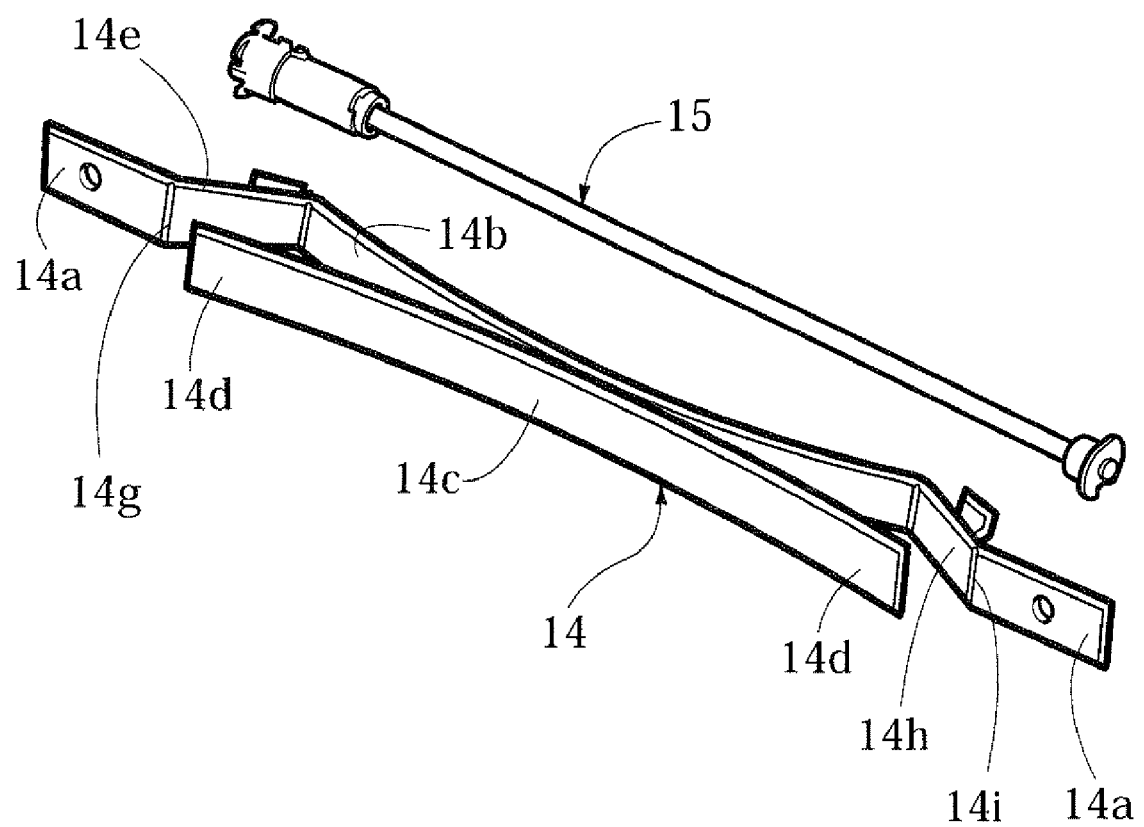
FIG. 3 illustrates a detail of FIG. 2, in an exploded condition and at an enlarged scale.

As may be seen more clearly in FIG. 2, the auxiliary supporting frame 8 is constituted by a frame structure defined by elements of welded metal wire, defining two side uprights 8a joined by a top cross member 8b and having bottom ends 8c. Projecting from the uprights 8 are portions of metal wire 9 and 10, for example terminating with hooked ends (not illustrated) for anchorage to the structure of the frame 2. Also envisaged is the case where the frame 8 together with the elements 6 constitutes an assembly that rocks about a horizontal axis, to obtain a movement forwards of the headrest in the event of rear impact, according to a technique in itself known, aimed at preventing whiplash.

Figure 4:
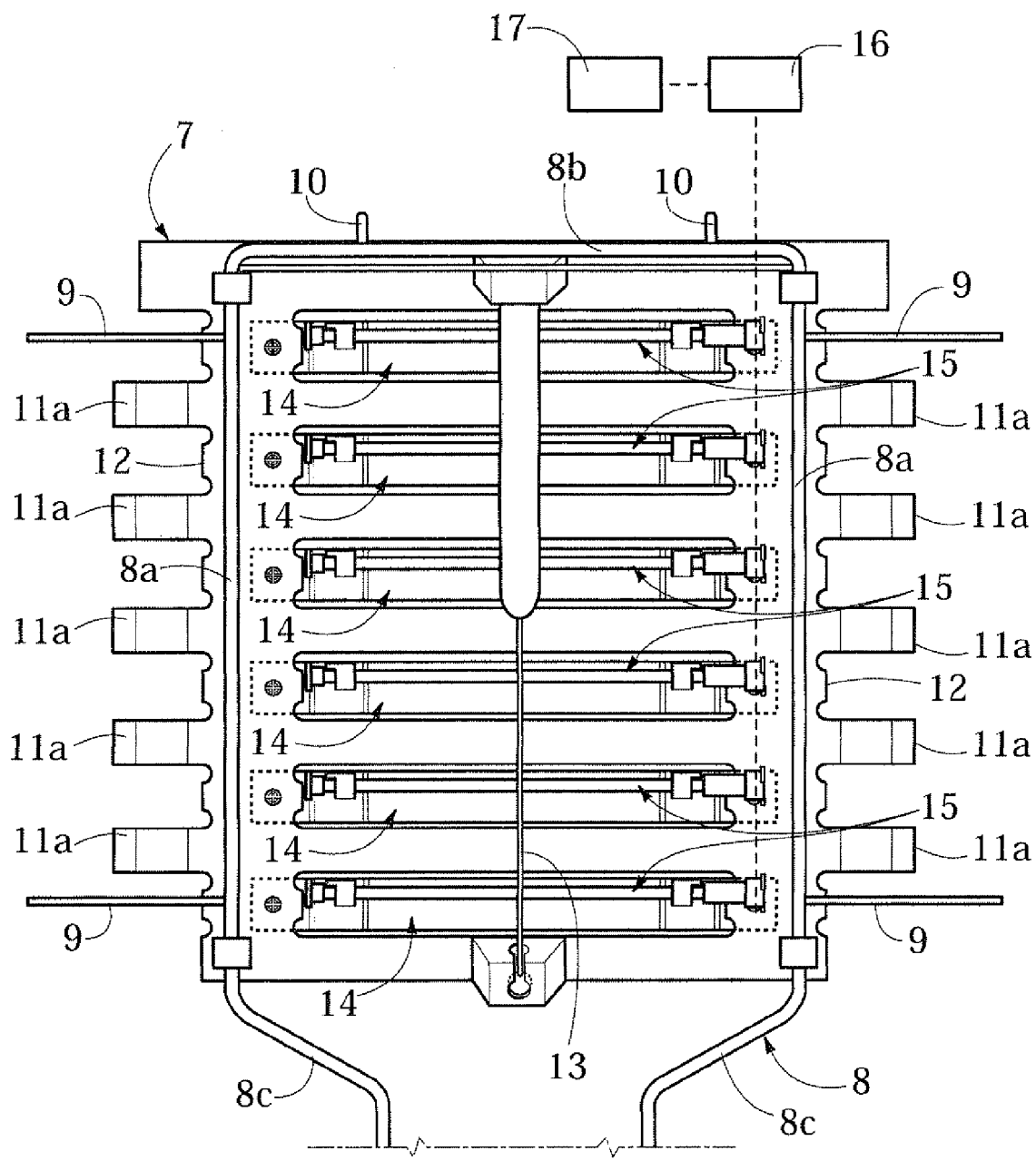
FIG. 4 is a front view of the supporting panel forming part of the device according to the invention.
Figure 5:
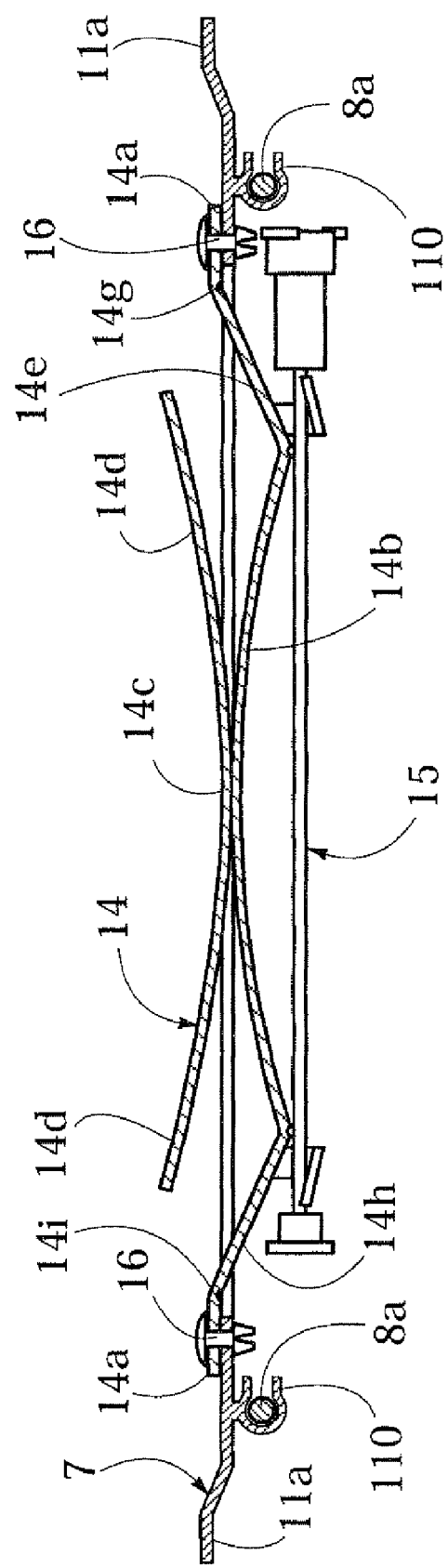
FIG. 5 is a view from above of the panel of FIG. 4.

With reference also to FIGS. 4 and 5, the lumbar supporting panel 7 is made, for example, of plastic material, and has a conformation substantially defined by a plurality of flattened cross members 11, set at a vertical distance from one another and joined by two side uprights, which are also of a flattened conformation, designated by 12, each cross member 11 having end portions 11a that project beyond the two side uprights 12.

Thanks to the aforesaid conformation, the lumbar supporting panel 7 is substantially flexible and is designed to be deformed so as to move, starting from a substantially plane condition of rest, towards a condition in which it is arched forwards, with its vertically central portion displaced forwards towards the front surface of the backrest so as to increase the degree of support for the back of the occupant in the lumbar area. The degree of arching is controlled by a flexible-cable actuator 13 (FIG. 4), for example manually controlled or controlled by an electric motor or by a shape-memory actuator, which causes a relative approach of the top cross member and of the bottom cross member of the lumbar supporting panel so as to bring about arching of the panel.

As may be seen in FIG. 5, the lumbar supporting panel has on its rear side, i.e., facing the side opposite to the back of the occupant, elastic clamp portions 110 designed to receive elastically and to clamp within them the vertical uprights 8a of the auxiliary supporting frame 8 so as to secure the lumbar supporting panel 7 to the auxiliary supporting frame 8, which, as already mentioned, is in turn anchored to the frame of the backrest.

Moreover associated to the supporting panel 7 is a plurality of horizontal laths 14, which are set at vertical distances apart and are elastically deformable from a configuration of rest to a configuration in which they are arched forwards, i.e., in the direction of the body of the occupant.

In the case of the embodiment illustrated (see FIG. 5), each lath 14 is made of a body of plastic material, having flanged ends 14a for fixing by means of screws or the like to corresponding portions of the lumbar supporting panel 7, and a central portion 14b arched in the direction of the body of the occupant. The central portion 14b is connected to the end portion 14a by means of two sectors 14e, 14h, which function as connecting rods so as to enable a displacement of the entire central part 14b in the direction of the body of the occupant by means of a rotation of the connecting rods 14e and 14h about the points 14g and 14i. Said movement, as well as the degree of arching of the central part 14b, are controlled by means of a shape-memory actuator, designated as a whole by the reference number 15, provided in association with each lath 14 and including at least one elongated element made, for example, of a shape-memory metal alloy which can undergo shortening following upon heating above a predetermined transition temperature, higher than the ambient temperature. The actuator 15 is, for example, of the type forming the subject of the document No. EP-A-1677014.

The geometry described above of the supporting lath is such as to enable a double amplification of the travel of the central part 14b in the direction of the back of the occupant (i.e., upwards as viewed in FIG. 5) with respect to the travel of activation of the shape-memory element (i.e., to the amount of its shortening) both following upon rotation of the connecting rods 14e,14h about the points 14g,14i and following upon the increase of arching of the central portion 14b.

As illustrated schematically in FIG. 4, connected to the shape-memory actuators 15 associated to the various laths 14 are electrical-supply means 16, which in turn are controlled by electronic control means 17. The electronic control means 17 are designed to control the actuators 15 independently of one another so as to cause a displacement of the laths 14 towards an active arched condition, independently of one another and according to any predetermined logic.

As likewise illustrated in FIG. 5, from each central portion 14c of each lath 14 there project two wings 14d defining a slightly arched cradle portion with concavity facing forwards (with respect to the orientation of the backrest). Each portion 14d of each lath 14 is designed to co-operate with the body of the padding 1a that is associated to the backrest illustrated in the annexed drawings. The body of the padding, which for reasons of clarity is not illustrated completely in the annexed drawings, can be obtained in any known way (for example, made of foamed plastic material) and, once again in a known way, can be provided with any type of coating or covering 1b, for example fabric, leather or synthetic material.

Once again according to a preferred embodiment of the invention, the electronic control means 17, are programmed for actuating in succession the laths 14 according to successive waves from above downwards, or else from below upwards, or else alternately from above downwards and from below upwards, so as to obtain a massaging effect, which is beneficial and relaxing for the occupant.

Of course, without prejudice to the principles of the invention, the details of construction and the embodiments may vary with respect to what is described and illustrated herein purely by way of example, without thereby departing from the scope of the present invention.

What is claimed is:

1. An ergonomic device for supporting the body of an occupant, for a chair or a seat, wherein it comprises a supporting panel provided with a plurality of supporting laths set at a distance from one another, which are elastically deformable from a configuration of rest to an active configuration, deformed and/or displaced and/or arched with respect to the configuration of rest, and in that each lath is provided with at least one actuator designed to cause deformation and/or displacement thereof towards the aforesaid active condition, said actuator comprising an element constituted by a shape-memory material, which can undergo a reduction in length following upon a heating beyond a predetermined transition temperature higher than the ambient temperature, and there being associated to said panel electrical-supply means for supplying an electric current to each of said shape-memory actuators in order to activate it, and electronic control means for governing said electrical-supply means so as to activate independently and/or in succession and/or simultaneously said shape-memory actuators according to a predetermined logic.

2. The supporting device according to claim 1, wherein it is shaped and prearranged for installation within a seat for motor vehicles in such a way as to co-operate with the padding of said seat.

3. The supporting device according to claim 2, wherein said panel is provided with means for connection to the frame of the backrest of a seat for motor vehicles in such a way as to co-operate with the padding of said backrest.

4. The supporting device according to claim 1, wherein said electronic control means are programmed for activating said laths in succession according to successive waves from above downwards, or else from below upwards, or else alternately from above downwards and from below upwards.

5. The supporting device according to claim 1, wherein said supporting panel is designed to perform a lumbar supporting function and is elastically deformable as a whole so as to assume an arched configuration with its vertically central portion displaced forwards, with reference to a general orientation of a backrest, with respect to its top and bottom portions, adjustment means being associated to said lumbar supporting panel for controlling said arched configuration of the lumbar supporting panel.

6. The supporting device according to claim 1, wherein each of said laths has end portions fixed to a lumbar supporting panel and a central portion having an arched configuration, with its central portion displaced in the direction of the body of the occupant, said shape-memory actuator comprising an elongated element constituted by a shape-memory metal alloy set according to a chord of said arched central portion, said electrical-supply means being designed to supply an electric current through said elongated shape-memory element to cause a heating thereof.

7. The supporting device according to claim 6, wherein the central portion is connected to said end portions by means of two sectors that function as connecting rod so as to enable a displacement of the central portion in the direction of the body of the occupant for a travel of amplified length with respect to the travel of activation of the aforesaid shape-memory element.

8. The supporting device according to claim 6, wherein the central portion is deformable towards a configuration in which it. is more arched forwards to obtain a further effect of amplification of the travel of activation of the shape-memory element.

9. The supporting device according to claim 6, wherein from a centre of said arched central portion of each lath there project two wings defining a slightly arched cradle portion, with the concavity facing the body of the occupant, which co-operates with a body of padding.

10. The supporting device according to claim 1, wherein said supporting panel is provided with clamp portions for fast snap-action assembly on an auxiliary supporting frame.

11. The supporting device according to claim 1, wherein the predetermined logic is to obtain a massaging effect.

* * * * *